United States Patent
Xiao et al.

(10) Patent No.: US 10,167,812 B2
(45) Date of Patent: Jan. 1, 2019

(54) RADIATION THERMAL ABSORBER BASED ON CHARACTERISTIC ABSORPTION SPECTRUM, AND STIRLING ENGINE AND OPERATION METHOD THEREOF

(71) Applicant: Zhejiang University, Hangzhou (CN)

(72) Inventors: Gang Xiao, Hangzhou (CN); Min Qiu, Hangzhou (CN); Mingjiang Ni, Hangzhou (CN); Qiang Li, Hangzhou (CN); Shulin Wang, Hangzhou (CN); Zhongyang Luo, Hangzhou (CN); Kefa Cen, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 91 days.

(21) Appl. No.: 15/617,620

(22) Filed: Jun. 8, 2017

(65) Prior Publication Data
US 2018/0038310 A1 Feb. 8, 2018

(30) Foreign Application Priority Data

Aug. 8, 2016 (CN) .......................... 2016 1 0641485

(51) Int. Cl.
*F02G 1/055* (2006.01)
*F02G 1/047* (2006.01)
(Continued)

(52) U.S. Cl.
CPC .............. *F02G 1/055* (2013.01); *F02G 1/047* (2013.01); *F03G 6/068* (2013.01); *F24S 90/00* (2018.05);
(Continued)

(58) Field of Classification Search
CPC ...... F02G 1/055; F02G 1/047; F02G 2254/30; F02G 1/043–1/06; F02G 2255/00;
(Continued)

(56) References Cited

U.S. PATENT DOCUMENTS 4,452,047 A * 6/1984 Hunt ..................... F02G 1/0435
60/641.15
5,404,723 A * 4/1995 Parker ................... F02G 1/0435
126/654

(Continued)

FOREIGN PATENT DOCUMENTS

JP 61046449 A * 3/1986 ............. F02G 1/055
JP 2010002077 A * 1/2010

*Primary Examiner* — Mark Laurenzi
*Assistant Examiner* — Xiaoting Hu
(74) *Attorney, Agent, or Firm* — David D. Brush; Westman, Champlin, & Koehler, P.A.

(57) ABSTRACT

A radiation thermal absorber based on characteristic absorption spectrum, a Stirling engine and an operation method thereof. The radiation thermal absorber allows working gas in the Stirling engine to absorb radiation heat quickly, and help the Stirling engine adopt assistant heating to ensure steady operation when solar power is not enough. The radiation thermal absorber includes a heater base, a radiation energy conversion device, heating tubes, a combustion chamber and valves of the heating tubes. The radiation energy conversion device converts the solar energy into radiation energy near a characteristic absorption peak of the working gas, and the working gas absorbs the radiation directly in depth.

8 Claims, 3 Drawing Sheets

(51) Int. Cl.
*F03G 6/06* (2006.01)
*F24S 90/00* (2018.01)

(52) U.S. Cl.
CPC ...... *F02G 2254/10* (2013.01); *F02G 2254/30* (2013.01); *F02G 2255/00* (2013.01); *F02G 2270/90* (2013.01); *Y02E 10/46* (2013.01)

(58) Field of Classification Search
CPC ............. F02G 2255/10; F02G 2255/20; F02G 2254/10; Y02E 10/46; F03G 6/068; F24S 70/12; F24S 90/00; F24S 2080/03
See application file for complete search history.

(56) References Cited

U.S. PATENT DOCUMENTS

| | | | | |
|---|---|---|---|---|
| 5,809,784 A | * | 9/1998 | Kreuter | F01B 29/08 60/650 |
| 5,884,481 A | * | 3/1999 | Johansson | F02G 1/055 60/517 |
| 8,397,505 B2 | * | 3/2013 | Penciu | F03G 6/06 126/690 |
| 2011/0120451 A1 | * | 5/2011 | Miles | F24S 70/10 126/635 |
| 2014/0020385 A1 | * | 1/2014 | Petkanchin | F03G 6/06 60/641.15 |

* cited by examiner

RADIATION THERMAL ABSORBER BASED ON CHARACTERISTIC ABSORPTION SPECTRUM, AND STIRLING ENGINE AND OPERATION METHOD THEREOF

CROSS-REFERENCE TO RELATED APPLICATIONS

The application claims priority to and the benefit of Chinese Patent Application No. 201610641485.1, filed on Aug. 8, 2016, entitled "Radiation Thermal Absorber Based on Characteristic Absorption Spectrum, and a Stirling Engine and an Operation Method Thereof", which is incorporated by reference herein in its entirety.

TECHNICAL FIELD

The present application relates to a radiation thermal absorber based on characteristic absorption spectrum, and a Stirling engine and an operation method thereof, particular to a radiation energy conversion device. The radiation energy conversion device absorbs the concentrated solar radiation on one side and converts it into thermal energy which is transferred to the other side. Then the thermal energy is converted into the radiative energy distributed in the vicinity of the characteristic absorption peak of working gas, causing the radiation heat to transfer into an expansion chamber. The device can also realize photothermal complementation and thus can be applied to a radiant heated Stirling heater in a dish-Stirling solar thermal power system.

BACKGROUND ART

Dish-Stirling solar thermal power generation has the highest optoelectronic conversion efficiency among the solar thermal power generation technologies. It is suitable for small distributed energy system due to its relatively low power output. This system uses a parabolic concentrator to collect solar radiation and reflect it to the focal point of the concentrator, and the Stirling engine is usually placed near the facula of the focal. The concentrated high-temperature high-heat-flux-density heat is absorbed by heating tubes of the Stirling engine to heat the working gas inside. Thus, the solar energy is converted into thermal energy, ensuring the stable operation of the Stirling engine, and driving the generator to generate electricity.

The Stirling engine (also known as heat engine) is an engine that can realize reversible cycle by utilizing external thermal sources, i.e. engine based on Stirling cycle. It can be a piston engine which converts thermal energy to mechanical work taking advantages of the periodic expansion and compression of the working gas sealed in the circuit. The external heating characteristics of the Stirling engine bring a prominent advantage of energy adaptability. It can burn not only fossil fuels such as coal, gasoline, diesel, and natural gas, and biomass such as wood chips, straw, alcohol, and biogas, but also low-grade energy such as exhaust heat and solar energy. The external combustion process is continuous and thus easy to control combustion and realize complete combustion, so emission of harmful gases can be greatly reduced. In addition, the engine does not have knock and exhaust wave phenomenaso that the engine can be operated smoothly and reliably. The Stirling engine can be used as the prime mover of power generation, refrigerator, heat pump and pressure generator. Therefore, it has a wide application in appliances, automobiles, ships, aerospace, microelectronics, biological cryopreservation, etc.

The Stirling engine includes five parts, i.e. a cooler, a heater, a regenerator, a compression chamber, and an expansion chamber. The working gas will reciprocate in the circuit under the drive of pistons, and be heated by an external thermal source in the heater and cooled by an external cold source in the cooler. With different heating methods, the corresponding structures of Stirling heater are different. According to the relevant researches, the heat tube heated by fuel gas is generally a U-shaped straight tube. The heater is composed of a certain number of heat tubes which have circumferentially balanced arrangement. A radiation energy conversion device, which can heat corresponding working gas through specific wavelength of radiation, is equipped on the wall of the heat tubes, to improve the heat absorption of gas. When the solar radiation is weak, hot gas can be supplemented to perform convective heat transfer with the heat tubes. The heat tubes of solar radiation heated Stirling engine are usually designed to be an outstretched and totally symmetrical structure in order to absorb more solar energy within a limited space. In addition, there is an adiabatic cavity structure surrounding the heat tubes to concentrate heat and reduce heat loss.

Since the solar radiation is highly instable, the Stirling engine does not meet operation power requirement when the solar radiation is insufficient or absent. Therefore, an additional heat source is in need, which can be realized by combining the fuel gas heating with solar heating. Researches show that fuel gas temperature is usually below 1000° C. and the particle content is low, so the convective heat transfer mode dominates, and the radiation heat transfer accounts for about 31% of the total heat transfer. There are plenty of researches focusing on enhancement of the convective heat transfer between fuel gas and heat pipe to improve performance of the Stirling engine. The traditional heaters of the Stirling engine must have sufficient heat transfer area to completely heat the working gas. This indicates that the heater of the Stirling engine has a relatively large dead volume which affects the efficiency of the Stirling engine significantly. Realizing rapid heat transfer of part of the working gas in the heater of the Stirling engine and reducing the dead volume of the heater of the Stirling engine will play a key role in improving the output power and cycle efficiency of the Stirling engine.

In the dish-Stirling solar thermal power generation system, the temperature of the focus point of solar energy is very high, which presents a huge challenge for the material of the heater of the Stirling engine. In general, the Stirling engine usually avoids high temperature energy, thereby reducing the overall thermal efficiency.

SUMMARY OF THE DISCLOSURE

The present application aims to provide a radiation thermal absorber based on characteristic absorption spectrum, and a Stirling engine and an operation method thereof. With solar radiation heating as the main heat source, combustion heating as the auxiliary heat source and by using the radiation energy conversion device, a part of solar radiation heat radiates working gas specific narrow-spectrum light waves distributed in the vicinity the absorption peak of working gas on the top of an expansion chamber to heat the working gas, and a part of solar radiation heats the working gas in the thermal absorber, which is suitable for the dish-Stirling solar thermal power system.

Traditional Stirling engines use ordinary heaters, and the hot end of the Stirling engine has large dead volume; the dead volume in the hot end is an important factor influencing the Stirling engine efficiency and the cycle power. Using a radiation energy conversion device can allow the working gas in the Stirling engine to absorb heat quickly, so that the dead volume in the hot end of the Stirling engine can be reduced, and cycle power and efficiency of the Stirling engine are improved.

The present application discloses a radiation thermal absorber for converting the solar radiation into characteristic absorption spectrum of Stirling cycle working gas, including a heater base, a radiation energy conversion device, heating tubes, a combustion chamber, and valves of the heating tubes, wherein the heating tubes are connected to the valves of the heating tubes, the valves of the heating tube are connected to the heater base, the combustion chamber is located around the heater tubes, the combustion chamber provides the heat needed by the heater tubes, and the radiation energy conversion device is positioned on the upper end of the heater base and an expansion chamber of the Stirling engine; the heater base has a first pore structure, a second pore structure, and a third pore structure, the second pore structure is positioned on the connection between the heater base and the expansion chamber, the first pore structure is positioned on the connection place between the heater base and a regenerator, and the third pore structure is positioned on the connection place between the expansion chamber and the regenerator and is close to the upper surface of the heater base.

Furthermore, the radiation energy conversion device is made from semiconductor or metal, and includes a radiation receiver, an intermediate layer and a radiation emitter, wherein the radiation receiver absorbs concentrated solar radiation and converts the concentrated solar radiation into thermal energy, the intermediate layer transports the thermal energy, and the radiation emitter emits radiant energy distributed in the vicinity of the characteristic absorption peak of working gas to heat the working gas in the expansion chamber directly; the radiant energy distributed in the vicinity of the characteristic absorption peak of the working gas has the same center wavelength of radiation spectrum with the characteristic absorption peak of the working gas, and has narrower spectral line width than that of the characteristic absorption peak of the working gas.

Furthermore, endothermic working gas of the radiation thermal absorber based on characteristic absorption spectrum includes one or more of carbon dioxide, butane, and butene.

Furthermore, the third pore structure is normally open; the opening and closing states of the first pore structure and the second pore structure are controlled by the valves of the heating tubes. The size of pores of the first pore structure and the second pore structure is controlled by controlling the valves of the heating tubes when the first pore structure and the second pore structure are open, thus the flow ratio of the working gas through the heating tubes and the third pore structure is controlled.

Furthermore, the heating tubes are evenly arranged along the circumference; each heating tube is bent into two sections in a three-dimensional curve form. The working gas enters one end of the heating tubes through the second pore structure from the expansion chamber, and enters the regenerator through the first pore structure from the other end of the heating tubes when the first pore structure and the second pore structure are both open.

Furthermore, a solar radiation heat source used by the radiation thermal absorber can be implemented by a solar concentrator system, and concentration is further implemented by a CPC concentrator.

The present application also discloses a Stirling engine, including the radiation thermal absorber for converting solar radiation into characteristic absorption spectrum of Stirling cyclic working gas, and further including a regenerator, a cooler, an expansion chamber, and a compression chamber, wherein the radiation thermal absorber is connected to one end of the regenerator; the other end of the regenerator is connected to the cooler; the exit of the cooler is connected to the compression chamber; the exit of the radiation thermal absorber is connected to the expansion chamber; and the expansion chamber, the radiation thermal absorber, the regenerator, the cooler and the compression chamber form a complete circuit, and working gas flows through the circuit.

Furthermore, the expansion chamber and the compression chamber are connected to the expansion chamber piston and the compression chamber piston respectively and adopt an expansion chamber piston ring and an compression chamber piston ring to separate the working gas in the expansion chamber and the compression chamber from environment respectively; the expansion chamber piston and the compression chamber piston are connected to a transmission structure through an expansion chamber piston rod and a compression chamber piston rod respectively; the transmission structure is connected to one end of a flywheel; and the other end of the flywheel is connected to a dynamo.

The present application also discloses a method for operating the Stirling engine, which includes the following steps:

A. when only adopting solar radiation to heat, closing a first pore structure and a second pore structure by controlling valves of heating tubes, the working gas in the expansion chamber expanding and doing work; solar radiation passing through a radiation energy conversion device, radiating specific narrow-spectrum light waves near the absorption peak of the working gas, exchanging radiation heat on the upper surface of a heater base, and transferring energy to the working gas in the expansion chamber; the heated working gas entering the regenerator through a third pore structure, being cooled by the cooler and compressed after entering the compression chamber, passing through the cooler, the regenerator, the third pore structure successively, and returning back to the expansion chamber; then repeating the above process;

B. when adopting both solar radiation and combustion auxiliary thermal sources to heat, opening the first pore structure and the second pore structure by controlling the valves of heating tubes, controlling the flow ratio of the working gas through the heating tubes and the third pore structure by adjusting the valves of heating tubes; the working gas in the expansion chamber expanding and doing work; solar radiation passing through the radiation energy conversion device, radiating the specific narrow-spectrum light waves distributed in the vicinity the absorption peak of the working gas, exchanging radiation heat on the upper surface of a heater base, and transferring the enemy to the working gas in the expansion chamber; a part of the heated working gas entering the regenerator through the third pore structure; the rest working gas entering one end of the heating tubes through the second pore structure; the working gas being further heated, entering the regenerator through the first pore structure, being cooled by the cooler and compressed after entering the compression chamber, passing through the cooler, the regenerator, the third pore structure successively, and returning back to the expansion chamber; then repeating the above process.

Generally speaking, compared with the existing technologies, the present application has the following advantages:

1. The Stirling engine using the radiation thermal absorber based on characteristic absorption spectrum which can realize the quick absorption of solar radiation energy, is suitable for the disc type solar radiation heating. In the case of using solar radiation as the heat source, the radiation energy conversion device radiates specific narrow-spectrum light waves near the absorption peak of the working gas, which is absorbed by the flowing working gas fast and efficiently. The device can make full use of the energy of the focused and high temperature part of the solar radiation center, promote the efficiency of solar-thermal conversion, and use focused solar energy with high temperature of more than 1000° C.

2. The Stirling engine using the radiation thermal absorber based on characteristic absorption spectrum can realize the quick absorption of solar radiation energy, facilitate improving the heat transfer of the hot end of the Stirling engine, reduce the dead volume of the hot end, and promote efficiency of the engine. Taking GPU-3 as an example, using the heater of the Stirling engine and adopting solar radiation heating entirely can reduce the dead volume of the hot end's heating tube volume by 80% or more, the corresponding efficiency increases from 28% to 34%, and power increases from 4 kW to 4.6 kW.

3. The Stirling engine using the radiation thermal absorber based on characteristic absorption spectrum is suitable for two heat sources of dish-Stirling solar radiation heating and combustion gas hearing, using high temperature gas produced by gas combustion to perform convective transfer heat ensures adequate heat supply, and the Stirling engine can be operated stably when the solar radiation is not enough or absent.

4. The Stirling engine using the radiation thermal absorber based on characteristic absorption spectrum can realize the quick absorption of solar radiation energy, facilitate improving the radiation heat transfer of the hot end of the Stirling engine, realize the fast thermal absorption of the working gas and solve the problem of heater tubes burst of the Stirling engine effectively.

DESCRIPTION OF EMBODIMENT

The present application will be further described with reference to the accompanying drawings.

Figure 1:
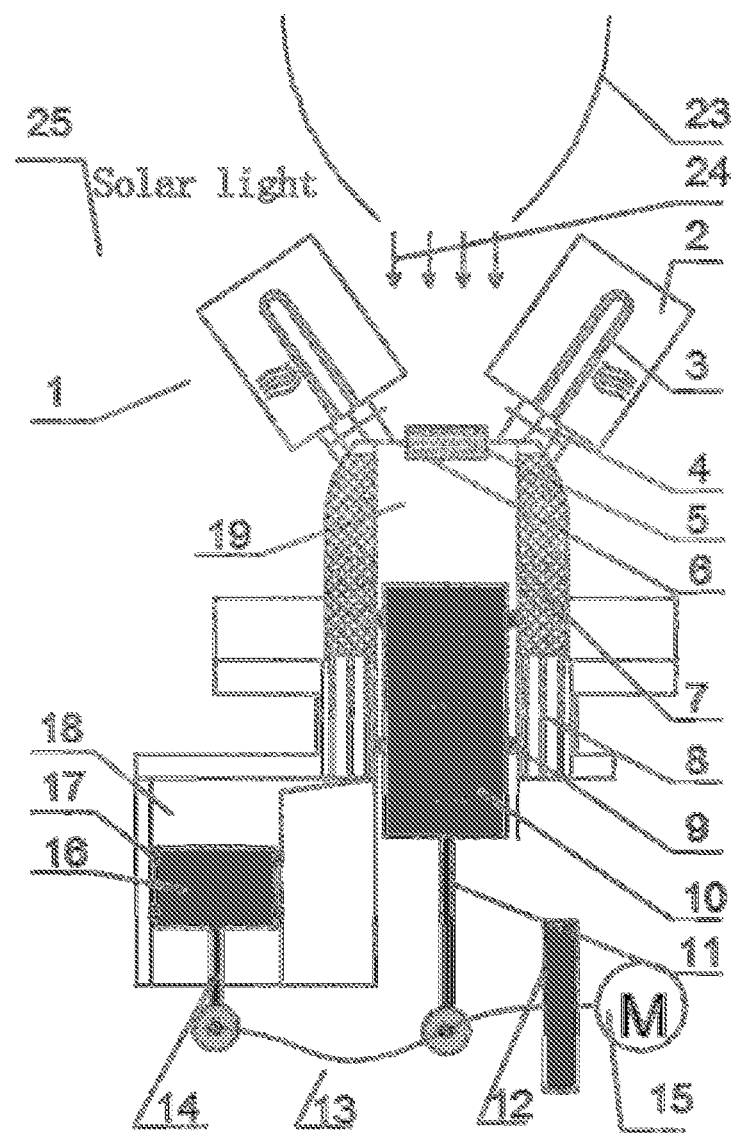
FIG. 1 shows a schematic structure diagram of a radiation heater and a Stirling engine according to the present application.
Figure 2:
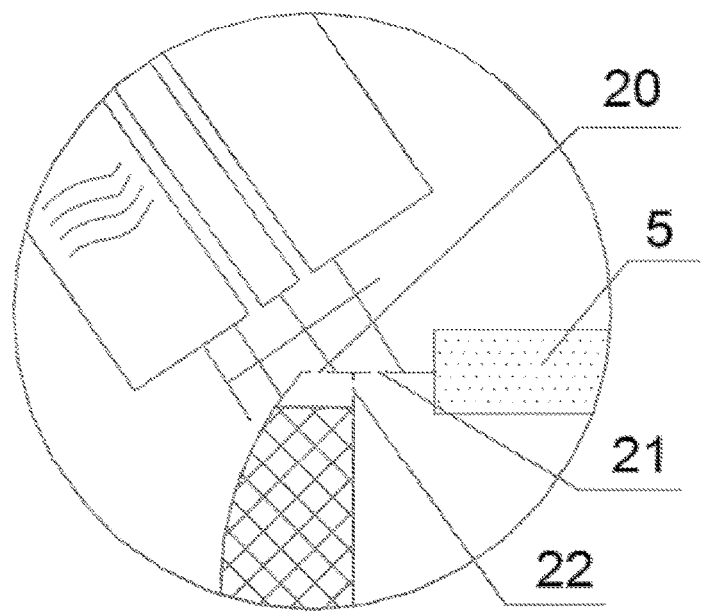
FIG. 2 shows a partial magnification of a radiation heater.
Figure 3:
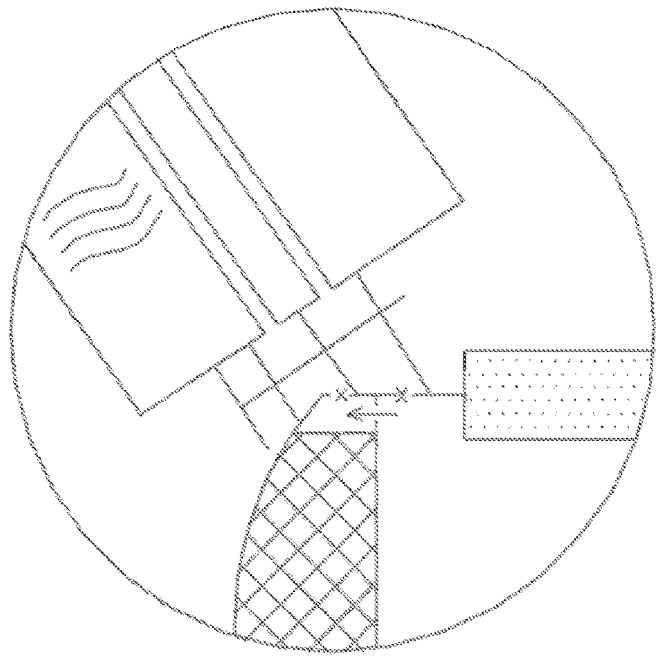
FIG. 3 shows a partial magnification of a radiation heater using solar radiation as the heat source only.

As shown in FIGS. 1, 2 and 3, the radiation thermal absorber of the present application includes a heater base 6, a radiation energy conversion device 5, heater tubes 3, a combustion chamber 2, and valves 4 of the heating tubes, wherein the heater tubes 3 are connected to the valves 4 of the heating tubes, the valves 4 of the heating tube are connected to the heater base 6, the combustion chamber 2 is located around the heater tubes 3, the combustion chamber 2 provides the heat needed by the heater tubes 3, and the radiation energy conversion device 5 is positioned on the upper end of the heater base 6 and an expansion chamber 19 of the Stirling engine; the heater base 6 has a first pore structure 20, a second pore structure 21, and a third pore structure 22, the second pore structure 21 is positioned on the connection place between the heater base 6 and the expansion chamber 19, the first pore structure 20 is positioned on the connection place between the heater base 6 and a regenerator 7, and the third pore structure 22 is positioned on the connection place between the expansion chamber 19 and the regenerator 7 and is close to the upper surface of the heater base 6.

In a specific embodiment of the present application, the radiation energy conversion device 5 is made from semiconductor or metal, and includes a radiation receiver, an intermediate layer and a radiation emitter, wherein the radiation receiver absorbs concentrated solar radiation and converts the concentrated solar radiation into thermal energy, the intermediate layer transports the thermal energy, and the radiation emitter emits radiant energy distributed in the vicinity of the characteristic absorption peak of working gas to heat the working gas in the expansion chamber directly; the radiant energy which is distributed in the vicinity of the characteristic absorption peak of the working gas has the same center wavelength of radiation spectrum with the characteristic absorption peak of the working gas, and has narrower spectral line width than that of the characteristic absorption peak of the working gas.

In a specific embodiment of the present application, endothermic working gas of the radiation thermal absorber 1 based on characteristic absorption spectrum includes one or more of carbon dioxide, butane, and butene.

In a specific embodiment of the present application, the third pore structure 22 is normally open; the opening and closing states of the first pore structure 20 and the second pore structure 21 are controlled by the valves of the heating tubes 4. The size of pores of the first pore structure 20 and the second pore structure 21 is controlled by controlling the valves 4 of the heating tubes when the first pore structure 20 and the second pore structure 21 are open, thus the flow ratio of the working gas through the heating tubes 3 and the third pore structure 22 is controlled.

In a specific embodiment of the present application, the heating tubes 3 are evenly arranged along the circumference; each heating tube is bent into two sections in a three-dimensional curve form; and the working gas enters one end of the heating tubes 3 through the second pore structure 21 from the expansion chamber 19, and enters the regenerator 7 through the first pore structure 20 from the other end of the heating tubes 3 when the first pore structure 20 and the second pore structure 21 are both open.

In a specific embodiment of the present application, a solar radiation heat source 24 used by the radiation thermal absorber 1 is implemented by a solar concentrator system, and concentration is further implemented by a CPC concentrator 23.

The present application also discloses a Stirling engine 25, including the radiation thermal absorber based on characteristic absorption spectrum 1, and further including a regenerator 7, a cooler 8, an expansion chamber 19, and a compression chamber 18, wherein the radiation thermal absorber 1 is connected to one end of the regenerator 7; the other end of the regenerator 7 is connected to the cooler 8; the exit of the cooler 8 is connected to the compression chamber 18; the exit of the radiation thermal absorber 1 is connected to the expansion chamber 19; and the expansion chamber 19, the radiation thermal absorber 1, the regenerator 7, the cooler 8 and the compression chamber 18 form a complete circuit, and working gas flows through the circuit.

In a specific embodiment of the present application, the expansion chamber 19 and the compression chamber 18 are connected to the expansion chamber piston 10 and the compression chamber piston 16 respectively and adopt an expansion chamber piston ring 9 and an compression chamber piston ring 17 to separate the working gas in the expansion chamber 19 and the compression chamber 18 from environment respectively; the expansion chamber piston 10 and the compression chamber piston 16 are connected to a transmission structure 13 through an expansion chamber piston rod 11 and a compression chamber piston rod 14 respectively; the transmission structure 13 is connected to one end of a flywheel 12; and the other end of the flywheel is connected to a dynamo 15.

First Embodiment

As shown FIGS. 1, 2 and 3, in the first embodiment only adopting solar radiation to heat, the first pore structure 20 and the second pore structure 21 are closed by controlling the valves of heating tubes, working gas in the expansion chamber expands and does work; solar radiation passes through the radiation energy conversion device, radiation energy radiates specific narrow-spectrum light waves in the vicinity the absorption peak of the working gas, exchanges radiation heat on the upper surface of a heater base, and transfers energy to the working gas in the expansion chamber; the heated working gas enters the regenerator through the third pore structure 22, cooled by the cooler and compressed after entering the compression chamber, passes through the cooler, the regenerator, the third pore structure 22 successively, and returns back to the expansion chamber; then the above process is repeated.

Second Embodiment

Figure 4:
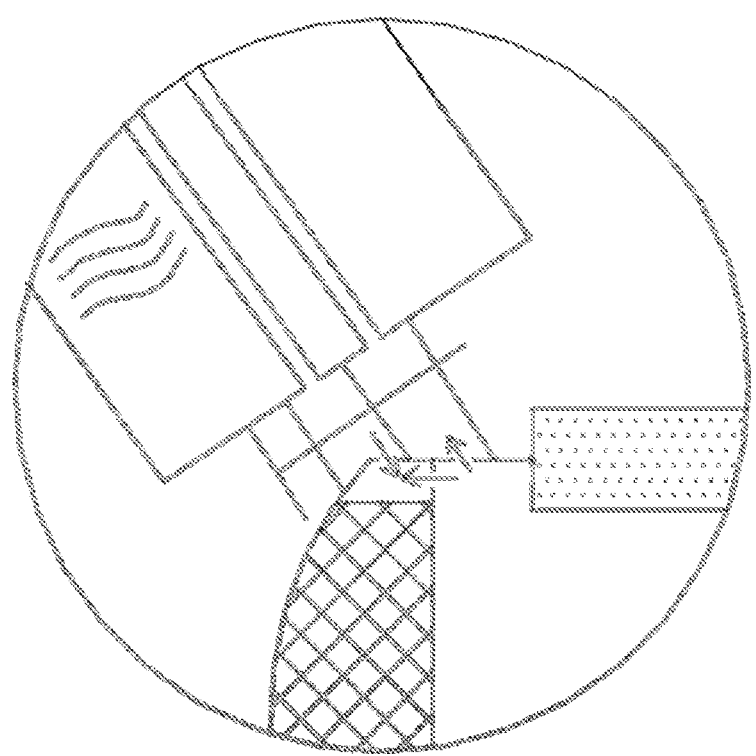
FIG. 4 shows a partial magnification of a radiation heater using complementary light source as heat source.

FIGS. 1, 2 and 4, show the structural diagram of the Stirling engine of the second embodiment.

In the second embodiment adopting both solar radiation and combustion auxiliary thermal sources to heat, the first pore structure 20 and the second pore structure 21 are opened by controlling the valves 4 of heating tubes, the flow ratio of the working gas through the heating tubes and the third pore structure 22 is controlled by adjusting the valves 4 of heating tubes; the working gas in the expansion chamber expands and does work; solar radiation passes through the radiation energy conversion device, radiates the specific narrow-spectrum light waves in the vicinity the absorption peak of the working gas, exchanges radiation heat on the upper surface of a heater base, and transfers the energy to the working gas in the expansion chamber; some of the heated working gas enters the regenerator through the third pore structure 22; the rest enters the heating tubes through the second pore structure 21; the working gas is further heated, enters the regenerator through the first pore structure 20, cooled by the cooler and compressed after entering the compression chamber, passes through the cooler, the regenerator, the third pore structure 22 successively, and returns back to the expansion chamber; then the above process is repeated.

Although specific embodiments of the present application have been described above, the present application is not limited to the above-described embodiments. It will also be apparent to those skilled in the art that any equivalent modification and substitution to the present application may be made within the scope of the present application. Accordingly, equivalent and modification without departing from the spirit and scope of the present application are intended to be included within the scope of the present application.

The invention claimed is:

1. A radiation thermal absorber based on characteristic absorption spectrum, comprising:
   a heater base,
   a radiation energy conversion device positioned on an upper end of the heater base and of an expansion chamber of a Stirling engine,
   heating tubes,
   a combustion chamber located around the heating tubes and providing heat needed by the heating tubes, and
   valves connected to the heating tubes and to the heater base, wherein the heater base has a first pore structure, a second pore structure, and a third pore structure, the second pore structure is positioned on a connection place between the heater base and the expansion chamber, the first pore structure is positioned on a connection place between the heater base and a regenerator, and the third pore structure is positioned on a connection place between the expansion chamber and the regenerator and is close to an upper surface of the heater base,
   wherein the radiation energy conversion device is made from semiconductor or metal, and includes a radiation receiver, an intermediate layer and a radiation emitter, the radiation receiver absorbs concentrated solar radiation and converts the concentrated solar radiation into thermal energy, the intermediate layer transports the thermal energy to the radiation emitter, and the radiation emitter emits radiant energy distributed in a vicinity of a characteristic absorption peak of a working gas to heat the working gas in the expansion chamber directly; and wherein the radiant energy distributed in the vicinity of the characteristic absorption peak of the working gas has a same center wavelength of radiation spectrum with the characteristic absorption peak of the working gas, and has a narrower spectral line width than that of the characteristic absorption peak of the working gas.

2. The radiation thermal absorber based on characteristic absorption spectrum according to claim 1, wherein the working gas of the radiation thermal absorber based on characteristic absorption spectrum includes one or more of carbon dioxide, butane, and butene.

3. The radiation thermal absorber based on characteristic absorption spectrum according to claim 1, wherein the third pore structure is normally open; the first pore structure and the second pore structure have opening and closing states that are controlled by the valves of the heating tubes; wherein size of pores of the first pore structure and the second pore structure are controlled by controlling the valves of the heating tubes when the first pore structure and the second pore structure are open, thus a flow ratio of the working gas through the heating tubes and the third pore structure is controlled.

4. The radiation thermal absorber based on characteristic absorption spectrum according to claim 1, wherein the heating tubes are evenly arranged along a circumference of the heater base; each heating tube is bent into two sections in a three-dimensional curve form; and the working gas enters one end of the heating tubes through the second pore structure from the expansion chamber, and enters the regenerator through the first pore structure from another end of the heating tubes when the first pore structure and the second pore structure are both open.

5. The radiation thermal absorber based on characteristic absorption spectrum according to claim 1, further comprising a solar radiation heat source, which is implemented by a solar concentrator system comprising a compound parabolic concentrator (CPC concentrator.

6. A Stirling engine comprising:
an expansion chamber;
a compression chamber;
a regenerator;
a radiation thermal absorber based on characteristic absorption spectrum, the absorber comprising:
a heater base,
a radiation energy conversion device positioned on an upper end of the heater base and of the expansion chamber,
heating tubes,
a combustion chamber located around the heating tubes and providing heat needed by the heating tubes, and
valves connected to the heating tubes and to the heater base, wherein the heater base has a first pore structure, a second pore structure, and a third pore structure, the second pore structure is positioned on a connection place between the heater base and the expansion chamber, the first pore structure is positioned on a connection place between the heater base and the regenerator, and the third pore structure is positioned on a connection place between the expansion chamber and the regenerator and is close to an upper surface of the heater base; and
a cooler,
wherein the radiation thermal absorber is connected to one end of the regenerator; the other end of the regenerator is connected to the cooler; an exit of the cooler is connected to the compression chamber; an exit of the radiation thermal absorber is connected to the expansion chamber; and the expansion chamber, the radiation thermal absorber, the regenerator, the cooler and the compression chamber form a complete circuit, and working gas flows through the circuit, and
wherein the radiation energy conversion device is made from semiconductor or metal, and includes a radiation receiver, an intermediate layer and a radiation emitter, the radiation receiver absorbs concentrated solar radiation and converts the concentrated solar radiation into thermal energy, the intermediate layer transports the thermal energy to the radiation emitter, and the radiation emitter emits radiant energy distributed in a vicinity of a characteristic absorption peak of the working gas to heat the working gas in the expansion chamber directly; and wherein the radiant energy distributed in the vicinity of the characteristic absorption peak of the working gas has a same center wavelength of radiation spectrum with the characteristic absorption peak of the working gas, and has a narrower spectral line width than that of the characteristic absorption peak of the working gas.

7. The Stirling engine according to claim 6, further comprising:
an expansion chamber piston;
a compression chamber piston;
a flywheel; and
a dynamo;
wherein the expansion chamber and the compression chamber are connected to the expansion chamber piston and the compression chamber piston, respectively, and adopt an expansion chamber piston ring and a compression chamber piston ring to separate the working gas in the expansion chamber and the compression chamber from environment, respectively; the expansion chamber piston and the compression chamber piston are connected to a transmission structure through an expansion chamber piston rod and a compression chamber piston rod, respectively; and the transmission structure is connected to one end of the flywheel; and the other end of the flywheel is connected to the dynamo.

8. A method comprising:
operating a Stirling engine comprising:
an expansion chamber;
a compression chamber;
a regenerator;
a radiation thermal absorber based on characteristic absorption spectrum, the absorber comprising:
a heater base,
a radiation energy conversion device positioned on an upper end of the heater base and of the expansion chamber,
heating tubes,
a combustion chamber located around the heating tubes and providing heat needed by the heating tubes, and
valves connected to the heating tubes and to the heater base, wherein the heater base has a first pore structure, a second pore structure, and a third pore structure, the second pore structure is positioned on a connection place between the heater base and the expansion chamber, the first pore structure is positioned on a connection place between the heater base and the regenerator, and the third pore structure is positioned on a connection place between the expansion chamber and the regenerator and is close to an upper surface of the heater base; and
a cooler,
wherein the radiation thermal absorber is connected to one end of the regenerator; the other end of the regenerator is connected to the cooler; an exit of the cooler is connected to the compression chamber; an exit of the radiation thermal absorber is connected to the expansion chamber; and the expansion chamber, the radiation thermal absorber, the regenerator, the cooler and the compression chamber form a complete circuit, and working gas flows through the circuit;
wherein the radiation energy conversion device is made from semiconductor or metal, and includes a radiation receiver, an intermediate layer and a radiation emitter, the radiation receiver absorbs concentrated solar radiation and converts the concentrated solar radiation into thermal energy, the intermediate layer transports the thermal energy to the radiation emitter, and the radiation emitter emits radiant energy distributed in a vicinity of a characteristic absorption peak of the working gas to heat the working gas in the expansion chamber directly; and wherein the radiant energy distributed in the vicinity of the characteristic absorption peak of the working gas has a same center wavelength of radiation spectrum with the characteristic absorption peak of the working gas, and has a narrower spectral line width than that of the characteristic absorption peak of the working gas; and
wherein operating the Stirling engine comprises the following acts:
A) when only adopting solar radiation to heat,
closing the first pore structure and the second pore structure by controlling the valves, the working gas in the expansion chamber expanding and doing work; the solar radiation being absorbed by the radiation energy conversion device to radiate specific narrow-spectrum light waves distributed in the vicinity of the absorption peak of the working gas, exchanging radiation heat on the upper surface of the heater base, and transferring energy to the working gas in the expansion chamber; the heated working gas entering the regenerator through the third pore structure, being cooled by the cooler, compressed after entering the compression chamber, then passing through the cooler, the regenerator, and the third pore structure successively, and returning back to the expansion chamber; then repeating the above process;

B) when adopting both solar radiation and combustion auxiliary thermal sources to heat, opening the first pore structure and the second pore structure by controlling the valves, controlling a flow ratio of the working gas through the heating tubes and the third pore structure by adjusting the valves; the working gas in the expansion chamber expanding and doing work; the solar radiation being absorbed by the radiation energy conversion device to radiate the specific narrow-spectrum light waves distributed in the vicinity of the absorption peak of the working gas, exchanging radiation heat on the upper surface of the heater base, and transferring the energy to the working gas in the expansion chamber; a part of the heated working gas entering the regenerator through the third pore structure; the rest of the working gas entering one end of the heating tubes through the second pore structure and being further heated before entering the regenerator through the first pore structure, the working gas being cooled by the cooler, compressed after entering the compression chamber, then passing through the cooler, the regenerator, and the third pore structure successively, and returning back to the expansion chamber; then repeating the above process.

\* \* \* \* \*

UNITED STATES PATENT AND TRADEMARK OFFICE
CERTIFICATE OF CORRECTION

PATENT NO. : 10,167,812 B2
APPLICATION NO. : 15/617620
DATED : January 1, 2019
INVENTOR(S) : Gang Xiao et al.

Page 1 of 1

It is certified that error appears in the above-identified patent and that said Letters Patent is hereby corrected as shown below:

In the Claims

In Claim 5, Column 9, Line 2, insert --)-- at the end of the phrase "(CPC concentrator".

Signed and Sealed this
Fourteenth Day of May, 2019

Andrei Iancu
*Director of the United States Patent and Trademark Office*